United States Patent [19]
Nagumo et al.

[11] Patent Number: 5,272,524
[45] Date of Patent: Dec. 21, 1993

[54] SOLID STATE CAMERA APPARATUS WITH SAMPLE RATE CONVERSION TO D1 AND D2 FORMATS

[75] Inventors: Fumio Nagumo; Takashi Asaida, both of Kanagawa, Japan

[73] Assignee: Sony Corporation, Tokyo, Japan

[21] Appl. No.: 902,813

[22] Filed: Jun. 23, 1992

[30] Foreign Application Priority Data

Jun. 28, 1991 [JP] Japan .................. 3-183394

[51] Int. Cl.⁵ .................. H04N 9/04; H04N 7/01
[52] U.S. Cl. ........................ 358/41; 358/140; 341/61
[58] Field of Search .................. 358/11, 41, 140, 160, 358/213.31, 213.11, 209, 213.26; 341/61

[56] References Cited

U.S. PATENT DOCUMENTS

| | | | |
|---|---|---|---|
| 4,870,661 | 9/1989 | Yamada et al. | 341/61 X |
| 4,890,165 | 12/1989 | Hasegawa | 358/213.26 |
| 4,903,919 | 2/1990 | Ito | 341/61 |
| 5,040,057 | 8/1991 | Gilblom et al. | 358/213.26 |
| 5,043,803 | 8/1991 | Asaida | 358/41 |
| 5,051,832 | 9/1991 | Losee et al. | 358/213.31 X |
| 5,095,364 | 3/1992 | Asaida et al. | 358/41 |
| 5,159,339 | 10/1992 | Fujita | 341/61 |
| 5,166,782 | 11/1992 | Asaida | 358/41 |
| 5,204,676 | 4/1993 | Hermann | 341/61 |
| 5,216,496 | 6/1993 | Miyamoto et al. | 358/41 |

Primary Examiner—Mark R. Powell
Attorney, Agent, or Firm—William S. Frommer; Alvin Sinderbrand

[57] ABSTRACT

A solid state camera apparatus converts image signals read from a solid state image-sensing device at a reading clock rate of a first frequency $f_{CCD}$ to digital video signals at the reading clock rate, converts the resulting digital video signal using a clock signal of a second frequency $f_{STD}$ [$f_{STD}=f_{CCD}*n/m$ (where m and n are positive integers and m>n)] to form digital video signals with a transmission clock rate of the second frequency $f_{STD}$, and applies image processing to the digital video signals at the reading clock rate of the first frequency $f_{CCD}$ so as to form output video signals.

12 Claims, 13 Drawing Sheets

FIG. 7

| INPUT DATA (Xn) | | | | | | COEFFICIENT (XP) | | | | | OUTPUT DATA (ym) | |
|---|---|---|---|---|---|---|---|---|---|---|---|---|
| Xn+3 | Xn+2 | Xn+1 | Xn | Xn-1 | Xn-2 | Xn-3 | a7 | a4 | a1 | a-3 | a-6 | a-9 | ym' | ym |
| Xn+4 | Xn+3 | Xn+2 | Xn+1 | Xn | Xn-1 | Xn-2 | a8 | a5 | a2 | a-2 | a-5 | a-8 | ym+1' | ym+1 |
| Xn+5 | Xn+4 | Xn+3 | Xn+2 | Xn+1 | Xn | Xn-1 | a9 | a6 | a3 | a-1 | a-4 | a-7 | ym+2' | |
| Xn+6 | Xn+5 | Xn+4 | Xn+3 | Xn+2 | Xn+1 | Xn | — | — | — | — | — | — | — | ym+2 |
| Xn+7 | Xn+6 | Xn+5 | Xn+4 | Xn+3 | Xn+2 | Xn+1 | a7 | a4 | a1 | a-3 | a-6 | a-9 | ym+3' | ym+3 |
| Xn+8 | Xn+7 | Xn+6 | Xn+5 | Xn+4 | Xn+3 | Xn+2 | a8 | a5 | a2 | a-2 | a-5 | a-8 | ym+4' | ym+4 |
| Xn+9 | Xn+8 | Xn+7 | Xn+6 | Xn+5 | Xn+4 | Xn+3 | a9 | a6 | a3 | a-1 | a-4 | a-7 | ym+5' | |
| Xn+10 | Xn+9 | Xn+8 | Xn+7 | Xn+6 | Xn+5 | Xn+4 | — | — | — | — | — | — | — | ym+5 |
| Xn+11 | Xn+10 | Xn+9 | Xn+8 | Xn+7 | Xn+6 | Xn+5 | a7 | a4 | a1 | a-3 | a-6 | a-9 | ym+6' | ym+6 |

TIME →

FIG.9

| INPUT DATA (Xn) | | | | | COEFFICIENT (XP) | | | | | | | OUTPUT DATA (Ym) | |
|---|---|---|---|---|---|---|---|---|---|---|---|---|---|
| Xn+3 | Xn+2 | Xn+1 | Xn | Xn-1 | Xn-2 | Xn-3 | a9 | a6 | a3 | a0 | a-3 | a-6 | a-9 | ym' | ym |
| Xn+4 | Xn+3 | Xn+2 | Xn+1 | Xn | Xn-1 | Xn-2 | — | a7 | a4 | a1 | a-2 | a-5 | a-8 | ym+1' | ym+1 |
| Xn+5 | Xn+4 | Xn+3 | Xn+2 | Xn+1 | Xn | Xn-1 | — | a8 | a5 | a2 | a-1 | a-4 | a-7 | ym+2' | |
| Xn+6 | Xn+5 | Xn+4 | Xn+3 | Xn+2 | Xn+1 | Xn | — | — | — | — | — | — | — | — | ym+2 |
| Xn+7 | Xn+6 | Xn+5 | Xn+4 | Xn+3 | Xn+2 | Xn+1 | a9 | a6 | a3 | a0 | a-3 | a-6 | a-9 | ym+3' | ym+3 |
| Xn+8 | Xn+7 | Xn+6 | Xn+5 | Xn+4 | Xn+3 | Xn+2 | — | a7 | a4 | a1 | a-2 | a-5 | a-8 | ym+4' | ym+4 |
| Xn+9 | Xn+8 | Xn+7 | Xn+6 | Xn+5 | Xn+4 | Xn+3 | — | a8 | a5 | a2 | a-1 | a-4 | a-7 | ym+5' | |
| Xn+10 | Xn+9 | Xn+8 | Xn+7 | Xn+6 | Xn+5 | Xn+4 | — | — | — | — | — | — | — | — | ym+5 |
| Xn+11 | Xn+10 | Xn+9 | Xn+8 | Xn+7 | Xn+6 | Xn+5 | a9 | a6 | a3 | a0 | a-3 | a-6 | a-9 | ym+6' | ym+6 |
| . | . | . | . | . | . | . | . | . | . | . | . | . | . | . | . |

TIME →

SOLID STATE CAMERA APPARATUS WITH SAMPLE RATE CONVERSION TO D1 AND D2 FORMATS

BACKGROUND OF THE INVENTION

1. Field of the Invention

This invention relates to solid state camera apparatus which performs digital signal processing on the output signal of a solid state image-sensing device so as to form an output video signal.

2. Description of the Prior Art

In general, in a solid state camera apparatus using a solid state image sensor having a discrete pixel structure, such as a CCD image sensor, since the solid state image sensor itself is a sampling system, it is known that an unwanted (loopback) component from the spatial sampling frequency $f_{CCD}$ is mixed in the image signal of the solid state sensor. In the past, an optical system has been provided, including a birefringence-type optical low-pass filter which suppresses the high frequency component of the baseband component of the image signal so as to satisfy the Nyquist conditions of the sampling system of the solid state image sensor, and prevent the addition of the unwanted component to the baseband component of the image signal.

In color television camera apparatuses which pick up color images, two-plate solid state apparatuses which pick up three primary-color images using a solid state image sensor for picking up green color images and solid state image sensors provided with color coding filters for red color pixels and blue color pixels, and three-plate type solid state apparatuses which pick up three primary-color images by separate solid state image sensors, and other multiple-plate solid state apparatuses are being commercialised.

Moreover, as a means for achieving an improvement in the resolution of the above multiple-plate type solid state apparatus, a so-called spatial pixel shifting method is known wherein image sensors for picking up red color images and for picking up blue color images are shifted by exactly ½ of the spatial sampling period of the pixels with respect to the solid state image sensor for picking up the green images. By using the spatial pixel shifting method, it is possible to realize a high resolution exceeding the limits of the number of pixels of the solid state image sensor in an analog output multiple-plate type solid state apparatus.

Also, as a standard for digital video tape recorders for commercial use in broadcasting stations etc, there are the D-1 standard, the D-2 standard, etc. Digital interfaces for the digital video related equipment meeting these standards are required for color television camera apparatus as well.

In the D-1 standard, which is the standard for 4:2:2 digital component video signals, the sampling frequency is 13.5 MHz, which corresponds to 858 times the horizontal frequency ($f_{H(NTSC)}$) in the NTSC system, and corresponds to 864 times the horizontal frequency ($f_{H(PAL)}$) in the PAL system. Locking is possible by a whole multiple of the horizontal frequencies in both systems. In the D-2 standard, which is a standard for digital component video signals, the sampling frequency is made $4f_{sc}$, that is four times the sub-carrier frequency, which minimizes the beat interference of the sub-carrier and the sampling clock. The sampling frequency $f_{S(NTSC)}$ in the NTSC system is 14.3 MHz and the sampling frequency $f_{S(PAL)}$ in the PAL system is 17.73 MHz.

As mentioned above, however, when trying to realize a color television camera apparatus which directly outputs a digital image signal complying with the D-1 standard or the D-2 standard, directly to output a digital video signal with a high resolution, little loopback strain, and an excellent picture quality, there is the problem that one can only obtain a partially-effective optical low-pass filter to be used for the prefilter for the solid state image sensor, that is, one with a sloping cut-off characteristic. Therefore the sampling rate (number of pixels) of the solid state image sensor used for the camera unit must be made higher than the sampling rate in the D-1 standard and the D-2 standard, if one considers the difficulty in obtaining both more excellent MTF characteristics and a reduced loopback strain component. Moreover, for image signals obtained by the solid state image sensor, if one considers the performance of the defect correction processing for each pixel of the solid state image sensor, etc, by digital processing, the prevention of the occurrence of beat interference, etc, it is desirable to make the sampling rate of the solid state image sensor and the sampling rate in the analog/digital conversion means for digitizing the image signals obtained by the solid state image sensor match. Also, as mentioned above, in the units of color television camera apparatuses which directly output digital image signals complying with the D-1 standard or D-2 standard, use has been made of solid state image sensors exclusively designed for these standards, with numbers of pixels individually set to correspond to the D-1 standard or D-2 standard.

SUMMARY OF THE INVENTION

One object of the present invention is to provide solid state camera apparatus allowing selective output of image data of the D-1 standard or the D-2 standard.

Another object of the present invention is to provide solid state camera apparatus able to form and output color image data of a sampling rate of the D-1 standard or the D-2 standard from image signals read out from solid state image sensors at a sampling rate higher than the standard D-1 or D-2 sampling rate.

Another object of the present invention is to provide solid state camera apparatus which avoids the effect of a partially-effective optical low-pass filter serving as a prefilter for the solid state image sensor.

According to the present invention there is provided a solid-state camera apparatus comprising:

a solid state image-sensing device;

an analog/digital conversion means for converting image signals read by said solid state image-sensing device at a reading clock rate of a first frequency $f_{CCD}$ into a digital video signal at said reading clock rate;

a rate conversion means for receiving an input digital video signal output from said analog/digital conversion means, converting the clock rate of said digital video signal based on a clock signal of a second frequency $f_{STD}$ [$f_{STD}=f_{CCD}*$ n/m (where m and m are positive integers and m>n)], and forming a digital video signal of a transmission clock rate of said second frequency $f_{STD}$; and a data processing means for performing image processing at said transmission clock rate on the digital video signal of said transmission clock rate output from said rate conversion means, the output signal of said data processing means being output as an output video signal.

According to the present invention there is also provided a solid state camera apparatus comprising:
- a solid state image-sensing device; a clock signal generating means for output of a reading clock signal of
- a first frequency FCCDI or a second frequency $f_{CCD2}$;
- an analog/digital conversion means which is selectively supplied with a reading clock signal of said first frequency $f_{CCD1}$ or said second frequency $f_{CCD2}$ generated at said clock generating means and for converting a first video signal or a second video signal read out from said solid state image-sensing device having a predetermined number of pixels to a first digital video signal or a second digital video signal based on the reading clock signal of said first frequency $f_{CCD1}$ or the reading clock signal of said second frequency $f_{CCD2}$;
- a rate conversion means which is supplied with said first digital video signal or said second digital video signal from said analog/digital conversion means and for converting said first digital video signal or said second digital video signal respectively to a digital video signal of a transmission clock rate of a third frequency $f_{STD1}$ [$f_{STD1} = f_{CCD1}*n/m$ (where m and n are positive integers and m>n)] or a digital video signal of a transmission clock rate of a fourth frequency $f_{STD2}$ [$f_{STD2} = f_{CCD2}*n/m$ (where m and n are positive integers and m>n)], said third frequency $f_{STD1}$ being equal to the sampling frequency of a first video signal format and said fourth frequency $f_{STD2}$ being equal to a sampling frequency of a second video signal format; and
- a data processing means for performing image processing on the digital signal of the transmission clock rate of said third frequency $f_{STD1}$ or the digital video signal of the transmission clock rate of said fourth frequency $f_{STD2}$ output from said rate conversion means, the output signal of said data processing means being output as an output video signal of said first video signal format or an output video signal of said second video signal format.

According to the present invention there is also provided a solid state camera apparatus comprising:
- a solid state image-sensing device for digitizing video signals read out at a reading clock rate of a first frequency $f_{CCD1}$ or a second frequency $f_{CCD2}$ at a clock rate of said first frequency $f_{CCD1}$ or said second frequency $f_{CCD2}$ and converting the digital video signals of a clock rate of said first frequency $f_{CCD1}$ or said second frequency $f_{CCD2}$ to digital video signals of a clock rate of a third frequency $f_{STD1}$ or digital video signals of a clock rate of a fourth frequency $f_{STD2}$ so as to obtain video signals of a first video signal format or a second video signal format, the number of pixels being selected based on this: and
- a clock signal generating means for supplying a reading clock signal of said first frequency $f_{CCD1}$ or said second frequency $f_{CCD2}$ to said solid state image-sensing device.

According to the present invention there is also provided a solid state camera apparatus comprising
- a solid state image-sensing device;
- an analog/digital conversion means for converting video signals read by said solid state image-sensing device at a reading clock rate of a first frequency $f_{CCD}$ into a digital video signal at said reading clock rate;
- a first rate conversion means which is supplied with said digital video signal output from said analog/digital conversion means and for converting the clock rate of said digital video signal based on a clock signal of a second frequency $2f_{STD}$ [$f_{STD} = f_{CCD}*n/m$ (where m and n are positive integers and m>n)] and forming a digital video signal of a processing clock rate of said second frequency $2f_{STD}$;
- a data processing means for performing image processing at a processing clock rate of said second frequency $2f_{STD}$ on the digital video signal of said second frequency $2f_{STD}$ output from said first rate conversion means;
- a second rate conversion means for converting the digital video signal of a processing clock rate of said second frequency $2f_{STD}$ output from said data processing means to a digital video signal of a transmission clock rate of a third frequency $f_{STD}$; and
- a digital/analog conversion means for converting a digital video signal of a processing clock rate of said second frequency $2f_{STD}$ output from said data processing means to an analog signal;
- the output signal of said second rate conversion means and the output signal of said digital/analog conversion means being output as output video signals.

According to the present invention there is also provided a solid state camera apparatus comprising:
- a solid state image-sensing device for picking up green color images, a solid state image-sensing device for picking up red color images, and a solid state image-sensing device for picking up blue color images disposed shifted spatially by exactly ½ of the repetition pitch of the pixels;
- an analog/digital conversion means for converting the various color signals read out at a reading clock rate of a first frequency $f_{CCD}$ from the respective solid state image-sensing devices to digital color signals at said reading clock rate;
- a rate conversion means which is supplied with the various digital color signals of said reading clock rate output from said analog/digital conversion means and for converting the clock rates of said various digital color signals based on the clock signal of a second frequency $f_{STD}$[$f_{STD} = f_{CCD}*n/m$ (where m and n are positive integers and m>n)] and forming various digital color signals of a transmission clock rate of said second frequency $f_{STD}$; and
- a data processing means for performing image processing at said reading clock rate on the various digital color signals of said reading clock output from said rate conversion means. The output signal of said data processing means being output as an output video signal.

According to the present invention there is also provided a solid state camera apparatus comprising:
- a solid state image-sensing device for picking up green color images, a solid state image-sensing device for picking up red color images, and a solid state image-sensing device for picking up blue color images arranged shifted spatially by exactly ½ of the repetition pitch of the pixels;

an analog/digital conversion means for converting the various color signals read out at a reading clock rate of a first frequency $f_{CCD}$ from the respective solid state image-sensing devices to digital color signals at said reading clock rate;

a rate conversion means which is supplied with the various digital color signals of said reading clock rate output from said analog/digital conversion means and for converting the clock rates of said various digital color signals based on the clock signal of a second frequency $2f_{STD}$ [$f_{STD}=f_{CCD}*n/m$ (where m and n are positive integers and m>n)] and forming various digital color signals of a processing clock rate of said second frequency $2f_{STD}$; and a data processing means for performing image processing at said processing clock rate on the various digital color signals of said reading clock rate output from said rate conversion means;

a second rate conversion means for converting digital video signals of said processing clock rate output from said data processing means to the various digital color signals of a transmission clock rate of a third frequency $f_{STD}$, said digital video signals of a transmission clock rate of said third frequency $f_{STD}$ being output as an output video signal; and a digital/analog conversion means for converting digital video signals of said processing clock rate from said data processing means to analog video signals, said analog video signals being output as output video signals.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 is a list used for explaining the operation of the rate converter of FIG. 5;

FIG. 9 is a list used for explaining the operation of the rate converter of FIG. 5;

DESCRIPTION OF THE PREFERRED EMBODIMENTS

Figure 1:
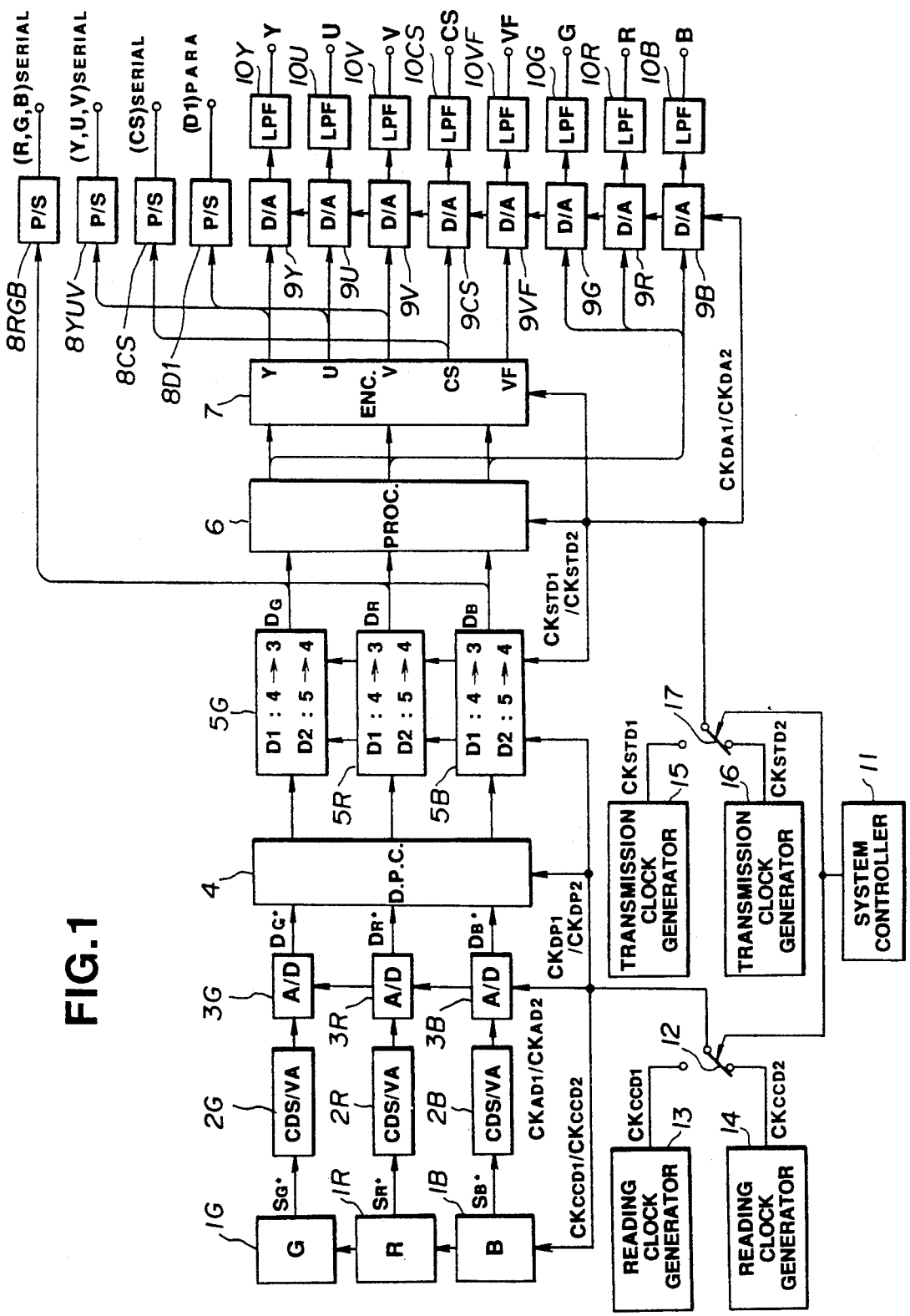
FIG. 1 is a block diagram of a first embodiment of the solid state camera apparatus of the present invention.

The first embodiment of solid state camera apparatus according to the present invention shown in the block diagram of FIG. 1 is an application of the present invention to an NTSC system color television camera apparatus which resolves the image light incident from a photographic lens through an optical low-pass filter into the three primary-color light components using a color separating prism, and derives the three primary-color images of the object picked up by three CCD image sensors 1R, 1G and 1B. It is designed so as to allow selective output of image data complying with the D-1 standard and image data complying with the D-2 standard.

Figure 2:
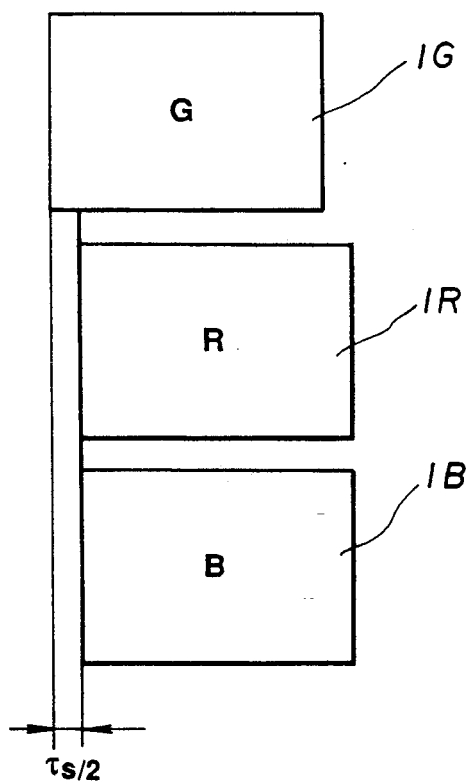
FIG. 2 is a schematic view of the arrangement of solid state image-sensing sensing devices in the apparatus of FIG. 1.

The three CCD image sensors 1R, 1G and 1B constituting the image-sensing unit of the solid state photographic apparatus employ the spatial pixel shifting method. As shown in FIG. 2, the CCD image sensors 1R and 1B for picking up the red color image and for picking up the blue color image respectively are arranged shifted at exactly ½ of the spatial sampling period $T_s$ with respect to the CCD image sensor 1G for picking up the green color image. The three CCD image sensors 1R, 1G and 1B are supplied with a first reading clock pulse $CK_{CCD1}$ from a first reading clock generator 13 or a second reading clock pulse $CK_{CCD2}$ from a second reading clock generator 14 through a clock switch 12 controlled to switch by a system controller 11. They are driven by the first or second reading clock pulses $CK_{CCD1}$ and $CK_{CCD2}$ so as to read out the photographic charges of the individual pixels.

The first reading clock generator 13 outputs a first reading clock pulse $CK_{CCD1}$ of a sampling frequency $f_{CCD1}$ (18.00 MHz) which is $m_1/n_1$ times the sampling frequency $f_{STD1}$ ($858f_H = 13.5$ MHz) of the D-1 standard (where $m_1$ and $n_1$ are integers and $m_1 > n_1$). For example, when $m_1 = 4$ and $n_1 = 3$:

$$\begin{aligned} f_{CCD1} &= f_{STD1} \cdot m_1/n_1 \\ &= 858 f_H \cdot 4/3 \\ &= 1144 f_H \\ &= 18.00 \text{ MHz} \end{aligned}$$

Further, the second reading clock generator 14 outputs a second reading clock pulse $CK_{CCD2}$ of a sampling frequency $f_{CCD2}$ (17.898 MHz) which is $m_2/n_2$ times the sampling frequency $f_{STD2}$ ($4f_{sc} = 14.3$ MHz) of the D-2 standard (where $m_2$ and $n_2$ are integers and $M_2 > n_2$) For example, when $m_2 = 5$ and $n_2 4$:

$$f_{CCD2} = f_{STD2} \cdot m_2/n_2$$
$$= 4f_{SC} \cdot 5/4$$
$$= 1137.5 f_H$$
$$= 17.898 \text{ MHz}$$

Moreover, the system controller 11 controls the switching of the clock switch 12 so that it selects the first reading clock pulse $CK_{CCD1}$ during the operational mode of the D-1 standard (hereinafter referred to as the D-1 mode) and selects the second reading clock pulse $CK_{CCD2}$ during the operational mode of the D-2 standard (hereinafter referred to as the D-2 mode).

In the D-1 mode, the effective number of pixels $N_1$ ($N^H \times N^V$) of the CCD image sensor where the photographic charges of the pixels are read out by the first reading clock pulse $CK_{CCD1}$ of a sampling frequency $f_{CCD1}$ of 18.00 MHz (number of pixels finally in system blanking) becomes:

$$N_1 = 947.8^H \times 485^V$$

since $f_{CCD1} = 1144 f_H$ and assuming that the scanning period for one horizontal line is 63.556 msec and the blanking period is 10.9 msec, and therefore, for one line:

$$N^H = 1144 \times (63.556 - 10.9)/63.556$$
$$= 947.8$$

and assuming that the effective number of pixels $V_1$ in the vertical direction is 485. Moreover, in the D-2 mode, the effective number of pixels $N_2$ ($N^H \times N^V$) of the CCD image sensor where the photographic charges of the pixels are read out by the second reading clock pulse $CK_{CCD2}$ of a sampling frequency $f_{CCD2}$ of 17.898 MHz (number of pixels finally in system blanking) becomes:

$$N_2 = 942.4^H \times 485^V$$

since $f_{CCD2} = 1137.5 f_H$ and assuming that the scanning period for one horizontal line is 63.556 msec and the blanking period is 10.9 msec, and therefore, for one line:

$$N^H = 1137.5 \times (63.556 - 10.9)/63.556$$
$$= 942.4$$

The ideal unit cell size in the case of application to a ⅔ inch optical system ($8.8^H \times 6.6^V = 11.0^D$) becomes 929 mm$^H \times$ 13.61 mm$^V$ in the D-1 mode and 9.34 mm$^H \times$ 13.61 mm$^V$ in the D-2 mode.

In this embodiment, the unit cell sizes of the CCD images sensors 1R, 1G and 1B are made 9.3 mm$^H \times$ 13.6 mm$^V$. The errors of the diagonal and the aspect ratio of the output image obtained by CCD image sensors of a unit cell size of 9.3 mm$^H \times$ 13.6 mm$^V$ are an error of the diagonal of +0.08 percent and an error of the aspect ratio of −0.23 percent in the D-1 mode, and an error of the diagonal of −0.3 percent and an error of the aspect ratio of +0.35 percent in the D-2 mode, which are negligible.

Note that if the unit cell size of the CCD image sensors 1R, 1G and 1B are made 9.25 mm$^H \times$ 13.55 mm$^V$, the error of the diagonal and of the aspect ratio become an error of the diagonal of −0.5 percent and an error of the aspect ratio of −0.4 percent in the D-1 mode and an error of the diagonal of −0.9 percent and an error of the aspect ratio of +0.15 percent in the D-2 mode. Further, if the unit cell size of the CCD image sensors 1R, 1G and 1B are made 9.2 mm$^H \times$ 13.5 mm$^V$, the error of the diagonal and the aspect ratio become an error of the diagonal of −0.7 percent and an error of the aspect ratio of +0.1 percent in the D-1 mode and an error of the diagonal of −1.3 percent and an error of the aspect ratio of −1.3 percent in the D-2 mode.

The three CCD image sensors 1R, 1G and 1B using the spatial pixel shifting method are, for three primary-color images of an object picked up, the CCD image sensor 1G for picking up a green color image, and the CCD image sensors 1R and 1B for picking up a red color image and for picking up a blue color image, spatially sampled at positions shifted by exactly ps/2. Therefore, the green color image signal $S_G*$ provided by the CCD image sensor 1G is 180° out of phase with the red and blue color image signals $S_R*$ and $S_B*$ respectivley provided by the CCD image sensors 1R and 1B.

The color image signals $S_R*$, $S_G*$ and $S_B*$ read out from the CCD image sensors 1R, 1G and 1B from the first and second reading clock pulses $CK_{CCD1}$ and $CK_{CCD2}$ are supplied to analog/digital (A/D) converters 3R, 3G and 3B through analog processing circuits 2R, 2G and 2B which perform correlation double sampling processing, level control etc.

The A/D converters 3R, 3G and 3B are selectively supplied with a clock rate equal to the sampling rate of the color image signals $S_R*$, $S_G*$ and $S_B*$, that is, clock pulses $CK_{AD1}$ and $CK_{AD2}$ of sampling frequencies $f_{CCD1}$ and $f_{CCD2}$ the same as the above reading clock pulses $CK_{CCD1}$ and $CK_{CCD2}$, through the clock switch 12. The A/D converters 3R, 3G and 3B digitize the color image signals $S_R*$, $S_G*$ and $S_B*$ at the above reading clock rates by the clock pulses $CK_{AD1}$ and $CK_{AD2}$ and form the digital color signals $D_R*$, $D_G*$ and $D_B*$ of signal spectra the same as the spectra of the color image signals $S_R*$, $S_G*$ and $S_B*$.

The digital color signals $D_R*$, $D_G*$ and $D_B*$ obtained from the A/D converters 3R, 3G and 3B are supplied to a first digital processing circuit 4.

The first digital processing circuit 4 is supplied with clock pulses $CK_{DP1}$ and $CK_{DP2}$ of sampling frequencies $f_{CCD1}$ and $f_{CCD2}$, the same as the above reading clock pulses $CK_{CCD1}$ and $CK_{CCD2}$, through the clock switch 12. The first digital processing circuit 4 performs image processing for each pixel such as defect correction without beat interference at the above reading clock rate by the clock pulses $CK_{DP1}$ and $CK_{DP2}$ on the digital color signals $D_R*$, $D_G*$ and $D_B*$ of the above reading clock rate. The digital color signals $D_R*$, $D_G*$ and $D_B*$ image processed for each pixel by the first digital processing circuit 4 are supplied to a second digital processing circuit 6 through rate converters 5R, 5G and 5B.

The rate converters 5R, 5G and 5B are supplied with the clock pulses $CK_{DP1}$ and $CK_{DP2}$ of the sampling frequencies $f_{CCD1}$ and $f_{CCD2}$ the same as the above reading clock pulsegs $CK_{CCD1}$ and $CK_{CCD2}$ through the clock switch 12 and are supplied with the first transmission clock pulse $CK_{STD1}$ from a first transmission clock generator 15 or a second transmission clock pulse $CK_{STD2}$ from a second transmission clock generator 16 through a clock switch 17.

The first transmission clock generator 15 outputs a first transmission clock pulse $CK_{STD1}$ of a sampling frequency $f_{STD1}$ (858 $f_H$ = 13.5 MHz) of the D-1 standard. The second transmission clock generator 16 outputs a second transmission clock pulse $CK_{STD2}$ of a sampling frequency $f_{STD2}$ (4$f_{sc}$ = 14.3 MHz) of the D-2 standard. The switch 17 is controlled in switching by the system controller 11 so as to select the first transmission clock pulse $CK_{STD}$ 1 during the D-1 mode and to select the second transmission clock pulse $CK_{STD}$ 2 during the D-2 mode.

Figure 5:
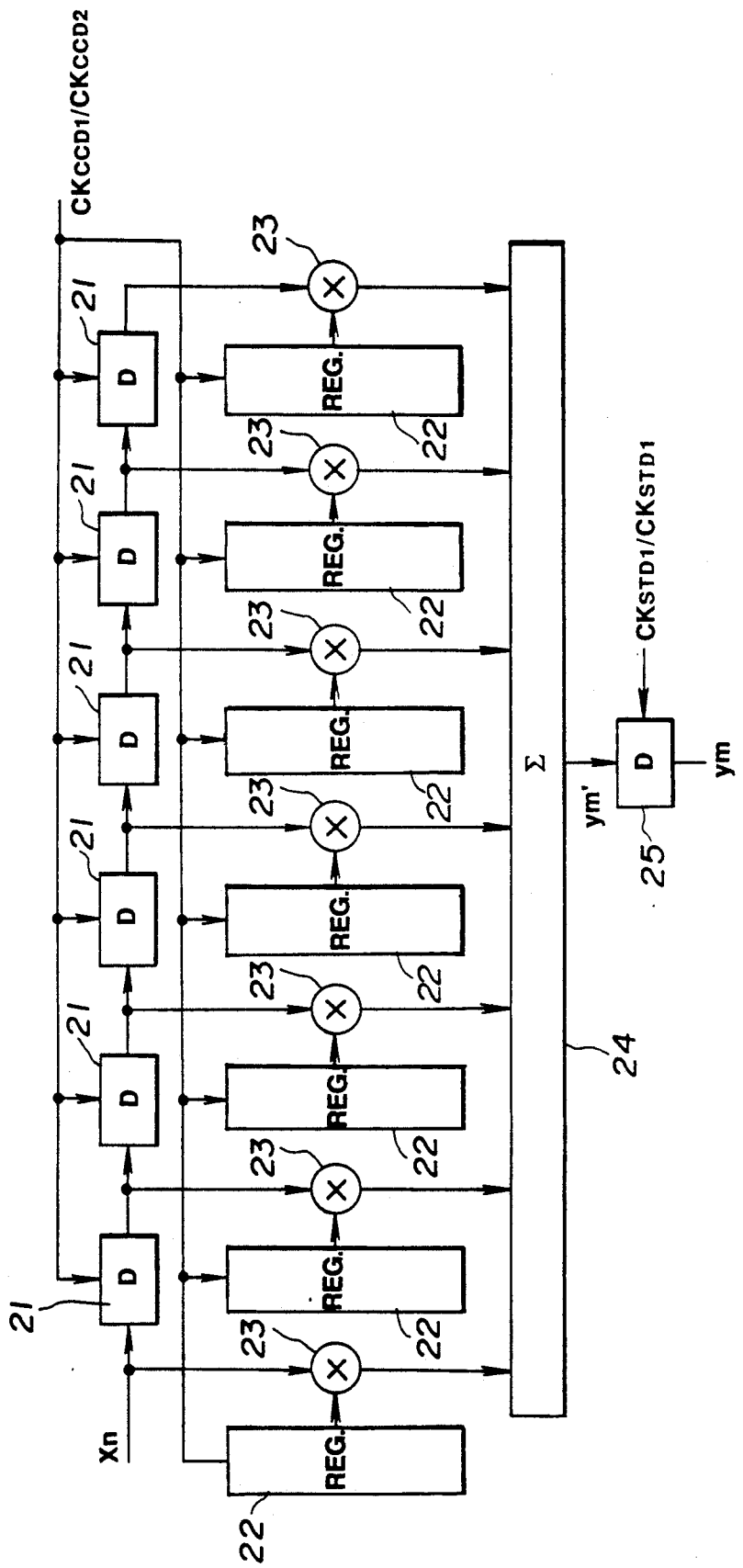
FIG. 5 is a block diagram of a rate converter of the apparatus of FIG. 1.

The rate converters 5R, 5G and 5B, as shown in FIG. 5, each comprise, for example, six shift registers 21 supplied with the input data $X_n$ of the reading clock rate of the above sampling frequencies $f_{CCD1}$ and $f_{CCD2}$, multipliers 23 which multiply a coefficient ap derived from a coefficient register 22 with the outputs of the shift registers 21, an adder 24 which adds the multiplied outputs of the multipliers 23, and a latch circuit 25 which fetches at a transmission clock rate of the sampling frequencies $f_{STD1}$ and $f_{STD2}$ of the D-1 and D-2 standards the added output $y_s'$ of the reading clock rate of the sampling frequencies $f_{CCD1}$ and $f_{CCD2}$ obtained from the adder 24.

Figure 6:
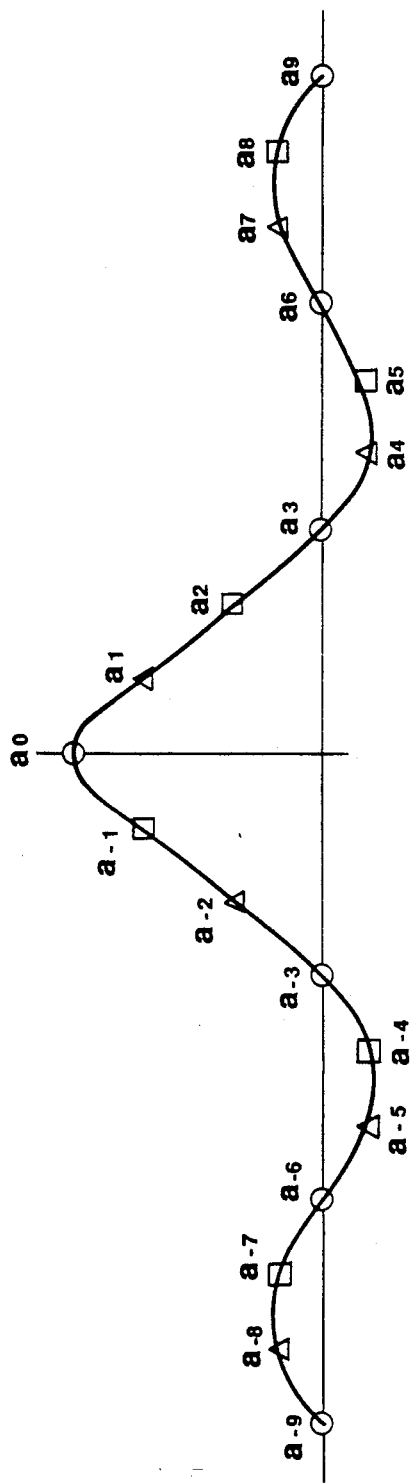
FIG. 6 is a schematic view of an impulse response in operation in the D-1 mode of an interpolation filter of the rate converter of FIG. 5.

The rate converter 5G performs rate conversion processing to convert the digital color signal $D_{G^*}$ of the reading clock rate of the sampling frequency $f_{CCD1}$ (18.00 MHz) to a digital color signal $D_G$ of the transmission clock rate of the sampling frequency $f_{STD1}$ (13.5 MHz) of the D-1 standard by the multipliers 23 being supplied with the impulse response coefficient ap shown in FIG. 6 from the coefficient register 22, in accordance with the processing sequence shown in FIG. 7.

Figure 8:
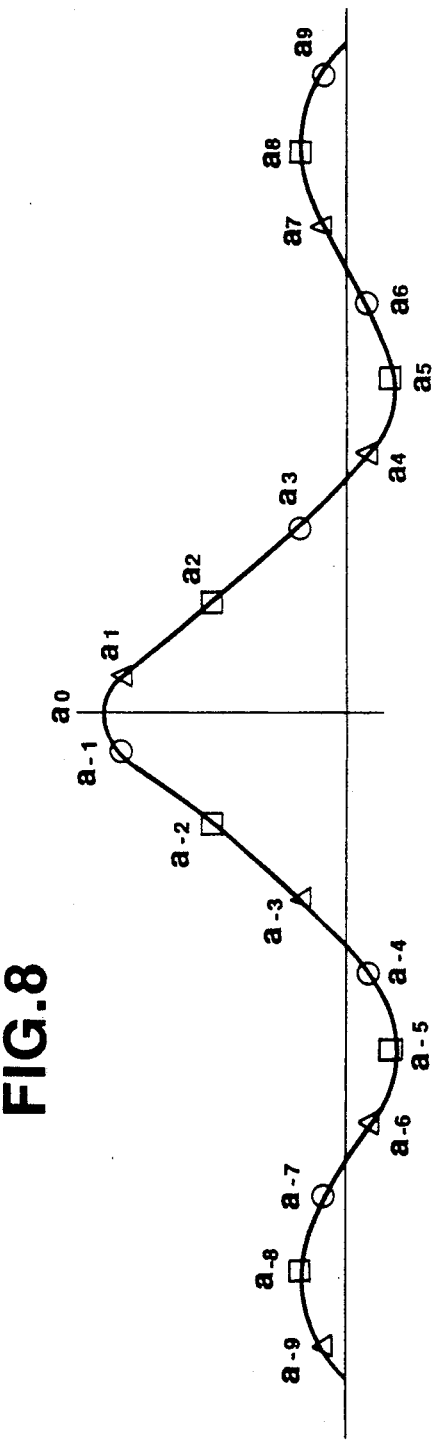
FIG. 8 is a schematic view of the impulse response in operation in the D-2 mode of the interpolation filter of the rate converter of FIG. 5.

The rate converters 5R and 5B which perform rate conversion processing on the digital color signals $D_{R^*}$ and $D_{B^*}$ convert the digital color signals $D_{R^*}$ and $D_{B^*}$ of the reading clock rate to digital color signals $D_R$ and $D_B$ of the transmission clock rate of the D-1 standard by the multipliers 23 being supplied with the impulse response coefficient ap shown in FIG. 8 from the coefficient register 22. in accordance with the processing sequence shown in FIG. 9.

Figure 3:
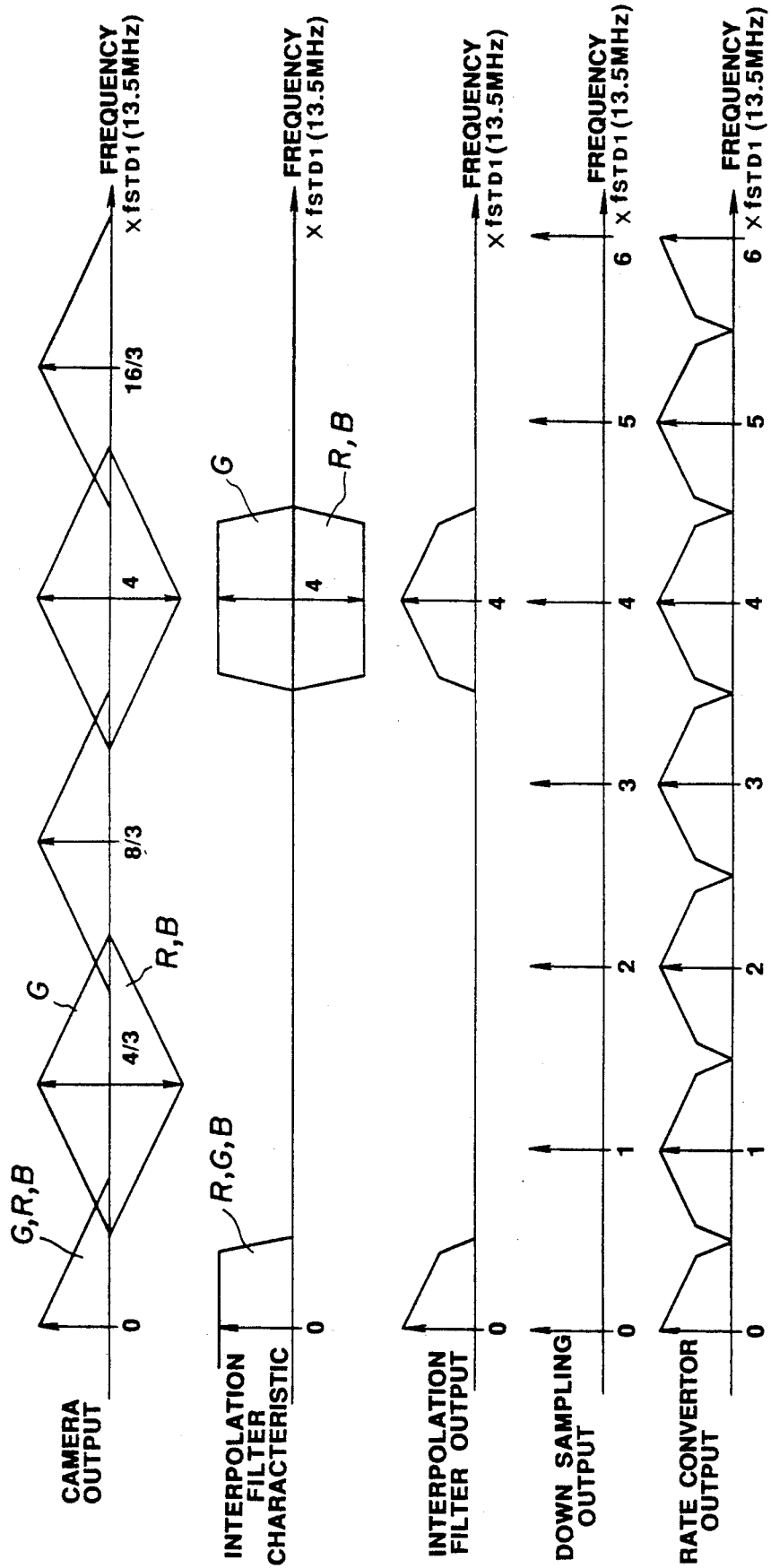
FIG. 3 is a schematic view of a signal spectrum used for explaining operation in the D-1 mode of the apparatus of FIG. 1.
Figure 4:
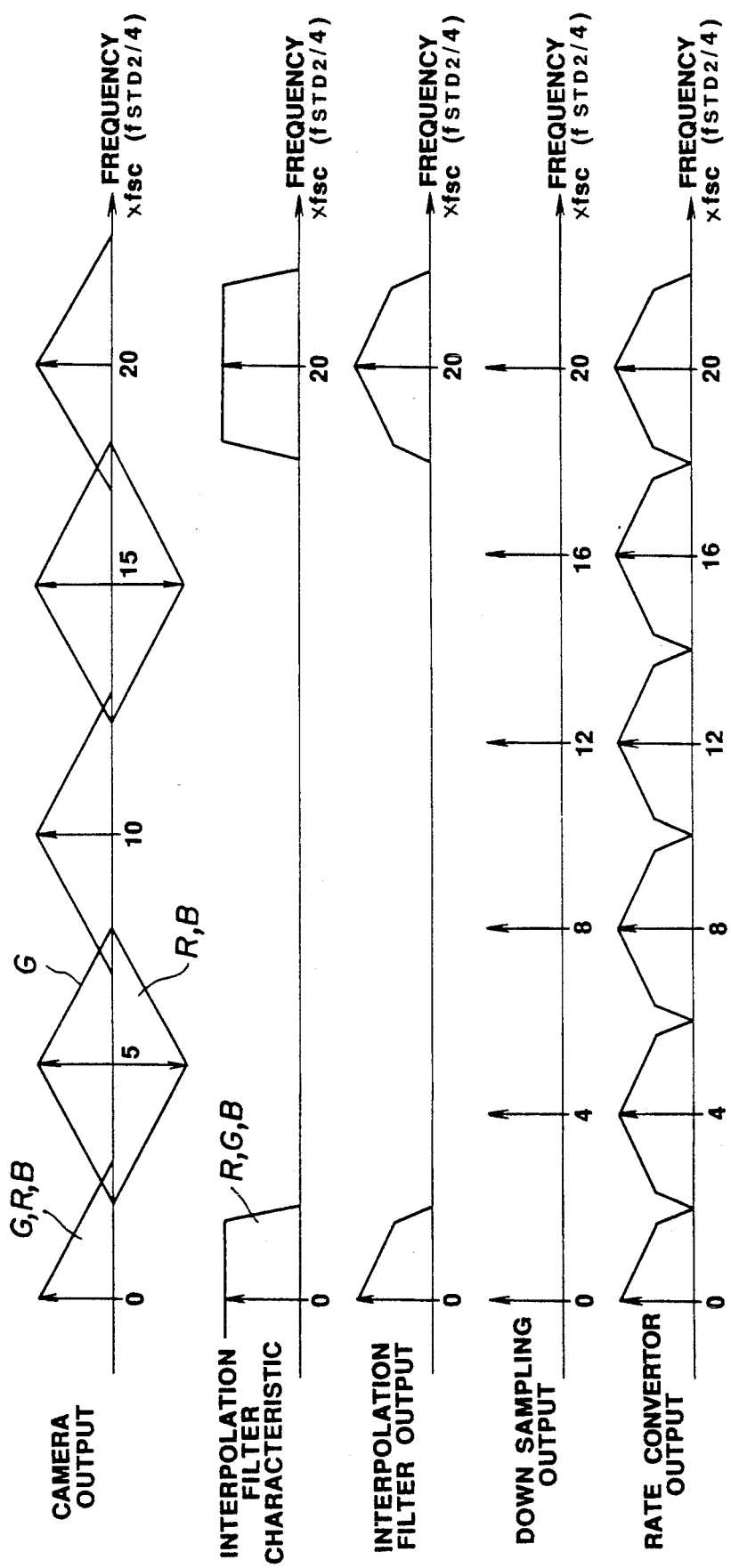
FIG. 4 is a schematic view of a signal spectrum used for explaining operation in the D-2 mode of the apparatus of FIG. 1.
Figure 10:
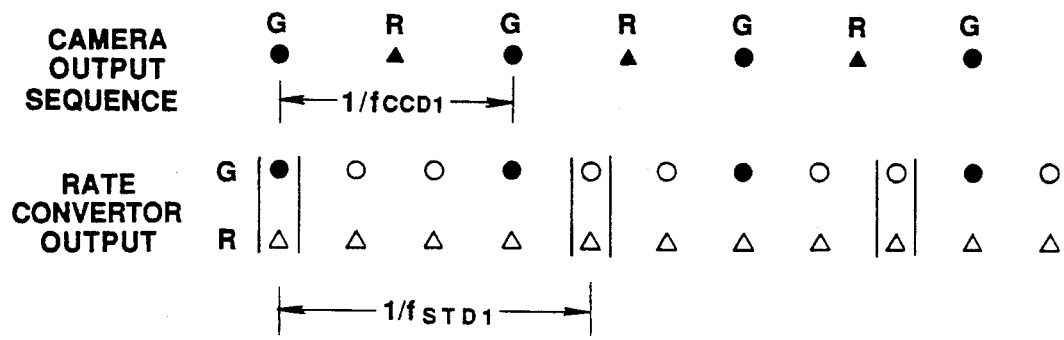
FIG. 10 is a schematic view used for explaining operation in the D-1 mode of the rate converter of FIG. 5.

That is, the rate converters 5R, 5G and 5B perform rate conversion processing on the digital color signals $D_{R^*}$, $D_{G^*}$ and $D_{B^*}$ of the reading clock rate of the sampling frequency $f_{STD1}$ (18.00 MHz) supplied from the first digital processing circuit 4 by interpolation processing and down sampling processing as shown in FIG. 3 and FIG. 10 in the D-1 mode, wherein if $m_1 = 4$ and $n_1 = 3$:

$$f_{STD1} = f_{CCD1} \cdot n_1/m_1$$
$$= 18.00 \cdot 3/4 \text{ MHz}$$
$$= 13.5 \text{ MHz}$$

and form the digital color signals $D_R$, $D_G$ and $D_B$ of the transmission clock rate of the sampling frequency $F_{STD}$ (13.5 MHz) of the D-1 standard.

In this embodiment, as mentioned above, the spatial pixel shifting method is employed, so the real samples ● of the green color signal $S_{G^*}$ obtained by the CCD image sensor 1G and the real samples ▲ of the red color photographic signal $S_{R^*}$ obtained by the CCD image sensor 1R have a phase difference of p between them. When the above-mentioned n is made an odd number (n = 3). if the up converted sequence * is set to phase match the real samples ● of the green color photographic data, for example, the red color photographic data and the blue color photographic data will not match in phase unless some measure is taken to give a difference of p to the two. In both the D-1 standard and the D-2 standard, the R, B and G are the same in phase, so it is necessary to insert a p phase shifter.

Corresponding to the phase inversion at, for example, $nf_{CCD}$ (= $4f_{STD1}$) in terms of the frequency region, by processing the green color photographic data and the red color photographic data and blue color photographic data, which have carriers mutually inverted at the sampling frequency $f_{CCD1}$, so as to invert the carrier phases at $nf_{CCD}$ (= $4f_{STD1}$) using an interpolation filter for up conversion having substantially the same characteristics in the pass band of 0 to $f_{STD}/2$, and different characteristics as shown in FIG. 3 where the carrier phases invert at $nf_{CCD}$ (= $4f_{STD1}$), it is possible to obtain from the above-mentioned interpolation filter the output as shown in FIG. 3 having matched phases at $nf_{CCD}$ (= $4f_{STD1}$).

If the characteristic which is substantially the same in the pass band of 0 to $f_{STD}/2$ and is different with the carrier phase at $nf_{CCD}$ inverted with respect to the green color photographic data, and the red color photographic data and blue color photographic data, where the above-mentioned n is an odd number, is expressed by impulse response, the above-mentioned FIG. 6 and FIG. 8 are obtained.

Figure 11:
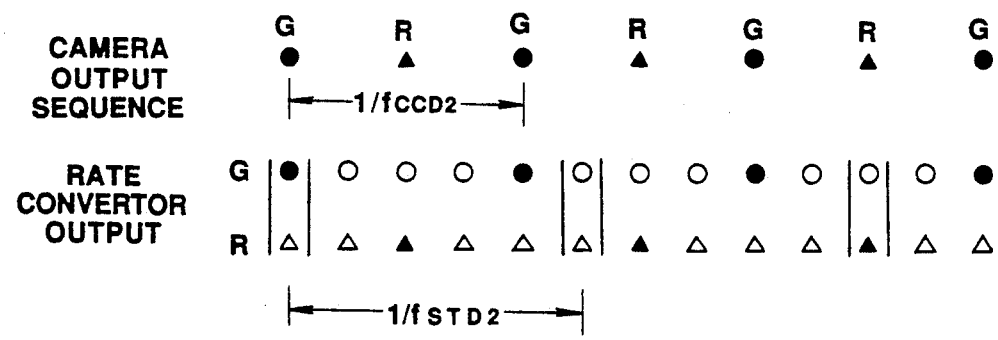
FIG. 11 is a schematic view used for explaining operation in the D-2 mode of the rate converter of FIG. 5.

The rate converters 5R, 5G, and 5B perform rate conversion processing as shown in FIG. 11 on the digital color signals $D_{R^*}$, $D_{G^*}$ and $D_{B^*}$ of the reading clock rate of the sampling frequency $f_{CCD2}$ (17.898 MHz) supplied from the first digital processing circuit 4 by the multipliers 23 being supplied with the coefficient ap of the impulse response from the coefficient register 22 in accordance with a predetermined processing sequence in the D-2 mode, wherein if $n_2 = 4$ and $m_2 = 5$:

$$f_{STD2} = f_{CCD} \cdot n_2/m_2$$
$$= 17.898 \cdot 4/5 \text{ MHz}$$
$$= 14.3 \text{ MHz}$$

and form the digital color signals $D_R$, $D_G$ and $D_B$ of the transmission clock rate of the sampling frequency $f_{STD2}$ (14.3 MHz) of the D-2 standard.

The digital color signals $D_R$, $D_G$ and $D_B$ of the transmission clock rate obtained from the rate converters 5R, 5G and 5B are serially output through a parallel/serial (P/S) conversion circuit 8RGB. Further, the digital color signals $D_R$, $D_G$ and $D_B$ of the transmission clock rate obtained from the rate converters 5R, 5G and 5B are subjected to processing such as gamma correction at the transmission clock rate in the second digital processing circuit 6, then are supplied to a third digital processing circuit 7 and are made analog in format by the digital/analog (D/A) converters 9R, 9G and 9B and are output as the analog color signals R, G and B through post-filters 10R, 10G and 10B.

In the above third digital processing circuit 7, matrix computation processing is performed on the digital color signals $D_R$, $D_G$ and $D_B$ of the transmission clock rate supplied from the second digital processing circuit 6 so as to form the digital luminance signal $D_Y$, the digital color difference signals $D_U$ and $D_V$, the composite video signal $D_{CS}$ and the viewfinder video signal $D_{VF}$ of the transmission clock rate.

The digital luminance signal $D_Y$ and the digital color difference signals $D_U$ and $D_V$ of the transmission clock rate obtained from the third digital processing circuit 7 are output serially through a parallel/serial conversion circuit 8YUV. Further, the composite video signal $D_{CS}$ of the transmission clock rate obtained from the third digital processing circuit 7 is serially output through a parallel/serial conversion circuit 8CS. Further, during the D-1 mode, looking at the digital luminance signal $D_Y$ and the digital chrominance difference signals $D_U$ and $D_V$ of the transmission clock rate of the sampling frequency $F_{STD1}$ obtained from the third digital processing circuit 7, down sampling processing is performed on the digital chrominance difference signals $D_U$ and $D_V$ and delay compensation processing is performed on the digital luminance signal $D_Y$ by a D-1 processing circuit 8D1 at a clock rate of 6.75 MHz and the results are output in parallel. The digital luminance signal $D_Y$, the digital chrominance difference signals $D_U$ and $D_V$, the composite video signal $D_{CS}$, and the viewfinder video signal $D_{VF}$ obtained from the third digital processing circuit 7 are converted to an analog format by digital/analog (D/A) converters 9Y, 9U, 9V, 9CS and 9VF and are output as the analog luminance signal Y, the analog chrominance difference signals U and V, the analog composite video signals CS, and the viewfinder video signal VF through post-filters 10Y, 10U, 10V, 10CS and 10VF, respectively.

Note that in the above embodiment, the present invention is applied to an NTSC system color television camera apparatus and image data complying with the D-1 standard and image data complying with the D-2 standard are selectively output, but the present invention is not limited to just the above embodiment. Solid state photographic apparatuses exclusively for the D-1 mode or the D-2 mode may be used. In this case too, it is possible to use common solid state image sensors.

Further, in the case of an NTSC system color television camera apparatus, in the D-1 mode, it is also possible to use the sampling frequency $f_{CCD1}$ where, assuming $m_1=9$ and $n_1=5$:

$$f_{CCD1} = f_{STD1} \cdot m_1/n_1$$
$$= 858 f_H \cdot 8/5$$
$$= 13.5 \cdot 8/5 \text{ MHz}$$
$$= 21.6 \text{ MHz}$$

and, in the D-2 mode, it is also possible to use the sampling frequency $f_{CCD2}$ where, assuming $m_2=3$ and $n_2=2$:

$$f_{CCD2} = f_{STD2} \cdot m_2/n_2$$
$$= 4 f_{SC} \cdot 3/2$$
$$= 6 f_{SC}$$
$$= 21.48 \text{ MHz}$$

Further, for example, it is possible to apply the present invention to a PAL system color television camera apparatus and selectively output image data complying with the D-1 standard and image data complying with the D-2 standard.

That is, when the present invention is applied to a PAL system color television camera apparatus, the first reading clock generator 13 outputs a first reading clock pulse $CK_{CCD1}$ of a sampling frequency $f_{CCD1}$ (18.00 MHz) of $m_1/n_1$ times the sampling frequency $f_{STD1}$ (858 $f_H=13.5$ MHz) of the D-1 standard (where $m_1$ and $n_1$ are integers and $m_1>n_1$). For example, where $m_1=4$ and $n_1=3$:

$$f_{CCD1} = f_{STD1} \cdot m_1/n_1$$
$$= 864 f_H \cdot 4/3$$
$$= 1152 f_H$$
$$= 18.00 \text{ MHz}$$

Also, the second reading clock generator 14 outputs a second reading clock pulse $CK_{CCD2}$ of a sampling frequency $f_{CCD2}$ (17.734 MHz), where $m_2=n_2$:

$$f_{CCD2} = f_{STD2} \cdot m_2/n_2$$
$$= 4 f_{SC}$$
$$= 1152 f_H$$
$$= 17.734 \text{ MHz}$$

The first transmission clock generator 15 outputs a first transmission clock pulse $CK_{STD1}$ of the sampling frequency $f_{STD1}$ ($858 f_H=13.5$ MHz) of the D-1 standard. Further, the second transmission clock generator 16 outputs a second transmission clock pulse $CK_{STD2}$ of the sampling frequency $f_{STD2}$ ($4f_{sc}=17.734$ MHz) of the D-2 standard.

The rate converters 5R, 5G and 5B perform rate conversion processing on the digital color signals $D_{R*}$, $D_{G*}$, and $D_{B*}$ of the reading clock rate of the sampling frequency $f_{CCD1}$ (18.00 MHz) supplied from the first digital processing circuit 4 in the D-1 mode, wherein if $m_1=4$ and $n_1=3$:

$$f_{STD1} = f_{CCD1} \cdot n_1/m_1$$
$$= 18.00 \cdot 3/4 \text{ MHz}$$
$$= 13.5 \text{ MHz}$$

and output the digital color signals $D_R$, $D_G$ and $D_B$ of the transmission clock rate of the sampling frequency $f_{STD1}$ (13.5 MHz) of the D-1 standard. Further, they perform rate conversion processing on the digital color signals $D_{R*}$, $D_{G*}$ and $D_{B*}$ of the reading clock rate of the sampling frequency $f_{CCD2}$ (17.34 MHz) supplied from the first digital processing circuit 4 in the D-2 mode and output the digital color signals $D_R$, $D_G$ and $D_B$ of the transmission clock rate of the sampling frequency $f_{STD2}$ (17.734 MHz) of the D-2 standard.

The ideal unit cell size in the case of application to a ⅔ inch optical system ($8.8^H \times 6.6^V = 11.0^D$) becomes 9.402 mm$^H \times$ 11.478 mm$^V$ in the D-1 mode and 9.542 mm$^H \times$ 11.478 mm$^V$ in the D-2 mode, so for example by making the unit cell sizes of the CCd image sensors 1R, 1G and 1B 9.4 mm$^H \times$ 11.4 mm$^V$, the error of the diagonal and the aspect ratio become an error of the diagonal of $-0.26$ percent and an error of the aspect ratio of $-0.66$ percent in the D-1 mode and an error of the diagonal of $-1.2$ percent and an error of the aspect ration of $+0.8$ percent in the D-2 mode. If the unit cell sizes are made 9.5 mm$^H \times$ 11.4 mm$^V$, the error of the diagonal and the aspect ratio become an error of the diagonal of $+0.4$ percent and an error of the aspect ratio of $-1.7$ percent in the D-1 mode and an error of the diagonal of $-0.5$ percent and an error of the aspect ratio of $-0.24$ percent in the D-2 mode. Note that the device is fully suitable for practical use if the error of the aspect ratio is less than 2 percent.

The image signals read out from the solid state image sensor of the embodiment at a reading clock rate of a first frequency $f_{CCD1}$ or a second frequency $f_{CCD2}$ may be converted to image data of a transmission clock rate of a third frequency $f_{STD1}$ or a fourth frequency $f_{STD2}$ by digitizing them at the transmission clock rate and applying rate conversion processing to at least one of the image data of a reading clock rcte of the first frequency $f_{CCD1}$ or the second frequency $f_{CCD2}$ Therefore, it becomes possible to form digital image signals complying with the D-1 standard or the D-2 standard from image signals read out from a single solid state image sensor. Further, image signals of a reading clock rate of a first frequency $f_{CCD1}$ or a second frequency $f_{CCD2}$ are higher than the transmission rate (sampling rate in the D-1 standard or the D-2 standard), so it becomes possible to avoid the effects caused by a partially - effective optical low-pass filter serving as the prefilter for the solid state image sensor and to form digital image signals which are high in resolution, have reduced loopback strain, and are excellent in image quality.

Figure 12:
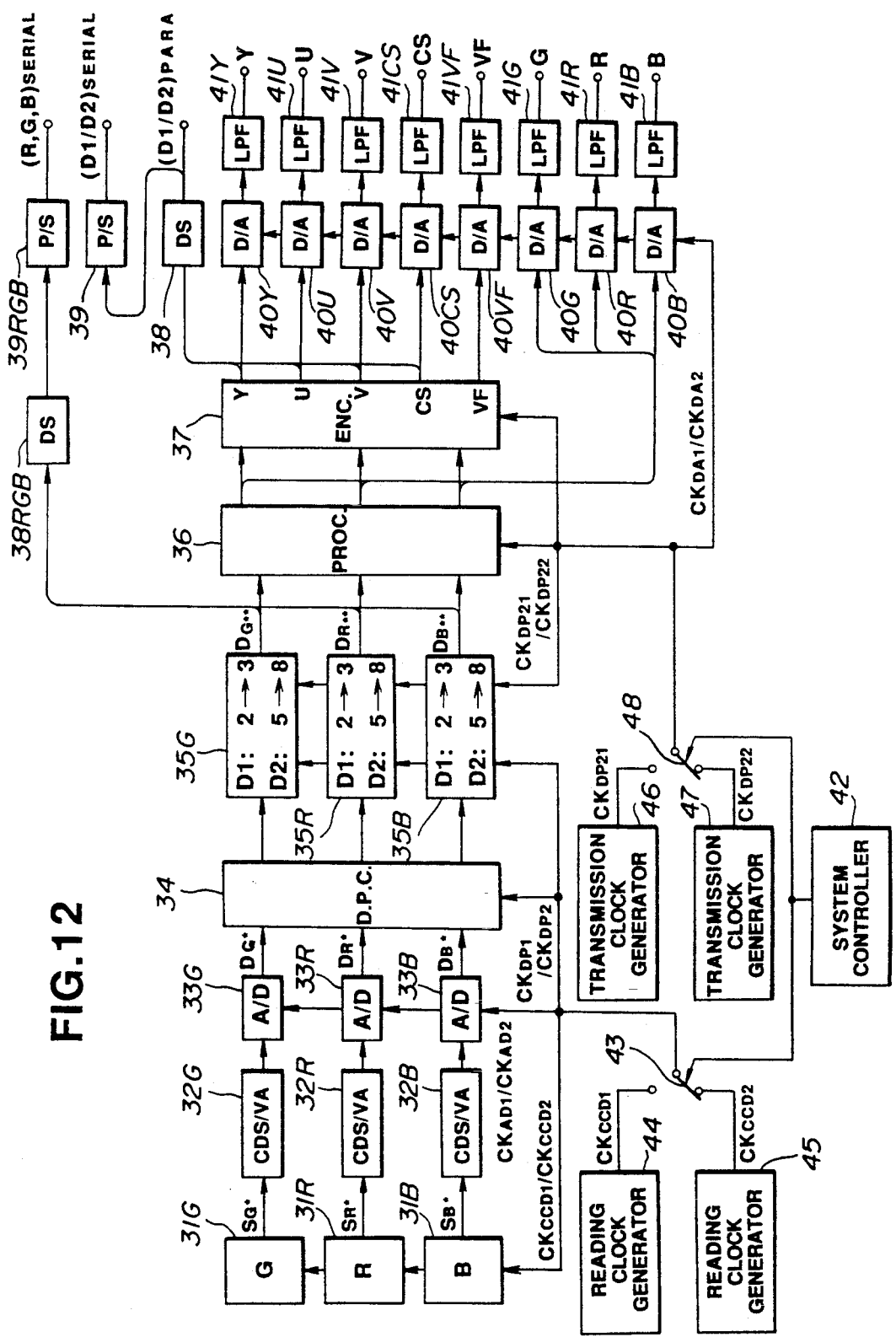
FIG. 12 is a block diagram of a second embodiment of solid state camera apparatus of the present invention.

Next, the second embodiment of solid state camera apparatus will be described with reference to the block diagram of FIG. 12.

In the second embodiment, three CCD image sensors 31R, 31G and 31B constituting the camera unit of the color television camera apparatus, like in the first embodiment, have the CCD image sensors 31R and 31B for picking up the red color image and for picking up the blue color image arranged shifted by exactly ½ of the spatial sampling period $\tau S$ of the pixels with respect to the CCD image sensor 31G for picking up the green color image. The three CCD image sensors 31R. 31G and 31B are supplied with a first reading clock pulse $CK_{CCD1}$ from a first reading clock generator 44 or a second reading clock pulse $CK_{CCD2}$ from a second reading clock generator 45 through a clock switch 43 controlled to switch by a system controller 42. They are driven by the first or second reading clock pulses $CK_{CCD1}$ and $CK_{CCD2}$ so as to read out the photographic charges of the pixels.

The first reading clock generator 44 outputs a first reading clock pulse $CD_{CCD1}$ of a sampling frequency $f_{CCD1}$ (18.00 MHz) which is $m_1/n_1$ times the sampling frequency $f_{STD1}$ ($858f^H = 13.5$ MHz) of the D-1 standard (where $m_1$ and $n_1$ are integers and $m_1 > n_1$). For example, when $m_1 = 4$ and $n_1 = 3$:

$$\begin{aligned} f_{CCD1} &= f_{STD1} \cdot n_1/m_1 \\ &= 858 f_H \cdot 4/3 \\ &= 1144 f_H \\ &= 18.00 \text{ MHz} \end{aligned}$$

Further, the second reading clock generator 45 outputs a second reading clock pulse $CK_{CCD2}$ of a sampling frequency $f_{CCD2}$ (17.898 MHz) which is $m_2/n_2$ times the sampling frequency $f_{STD2}$ ($4f_{sc} = 14.3$ MHz) of the D-2 standard (where $m_2$ and $n_2$ are integers and $m_2 > n_2$). For example, when $m_2 = 5$ and $n_2 = 4$:

$$\begin{aligned} f_{CCD2} &= f_{STD2} \cdot m_2/n_2 \\ &= 4_{SC} \cdot 5/4 \\ &= 1137.5 f_H \\ &= 17.898 \text{ MHz} \end{aligned}$$

Moreover, the system controller 42 controls the switching of the clock switch 42 so that it selects the first reading clock pulse $CK_{CCD1}$ in the D-1 mode and selects the second reading clock pulse $CK_{CCD2}$ in the D-2 mode.

Figure 13:
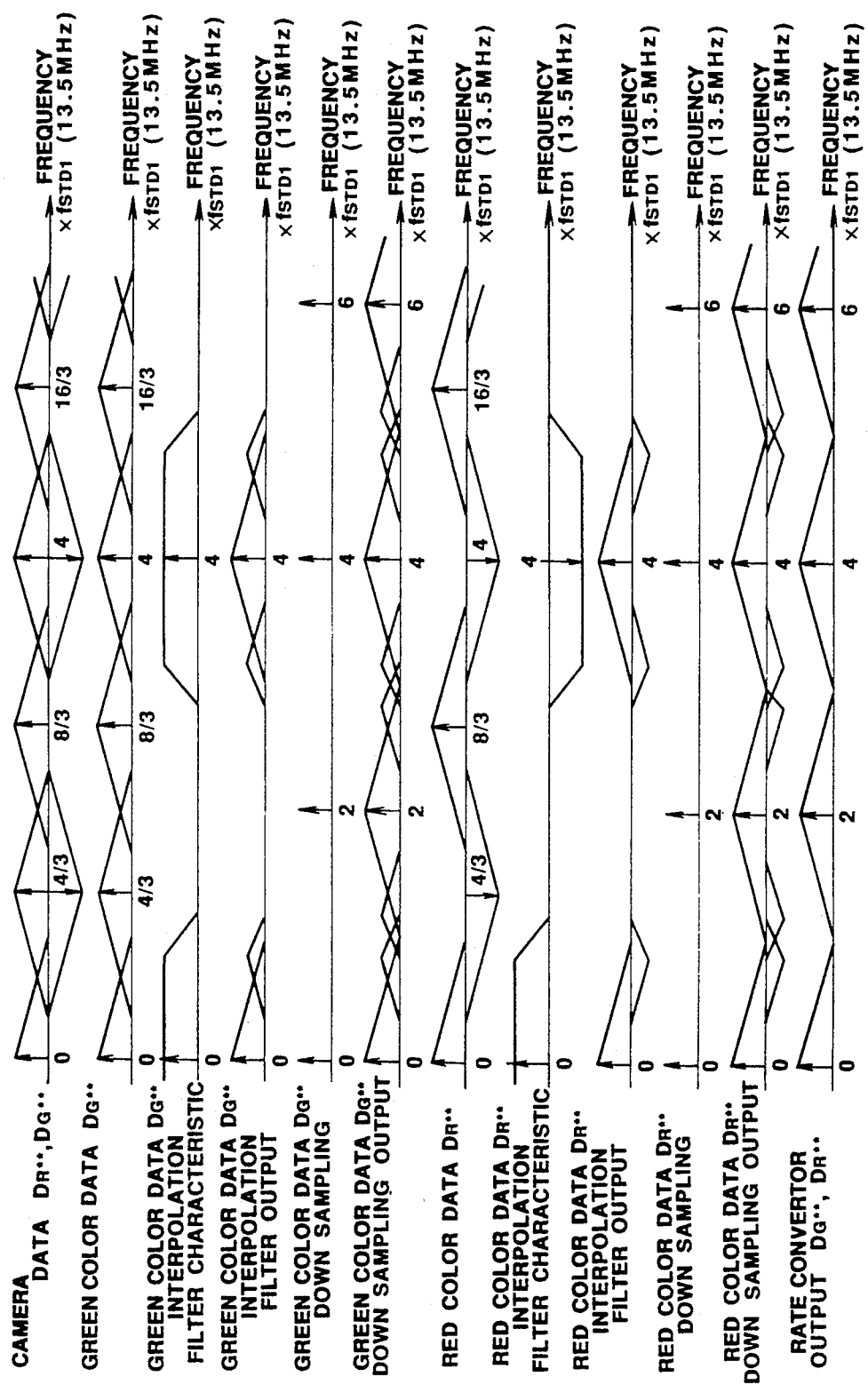
FIG. 13 is a schematic view of a signal spectrum used for explaining operation in the D-1 mode of the apparatus of FIG. 12.

The three CCD image sensors 31R, 31G and 31B using the spatial pixel shifting method are, for three primary-color images of an object picked up, the CCD image sensor 31G for picking up a green color image and the CCD image sensors 31R and 31B for picking up a red color image and for picking up a blue color image spatially sampled at positions shifted by exactly ps/2. Therefore, the green color image signal $S_{G^*}$ provided by the CCD image sensor 31G is 180° out of phase with the red and blue color image signals $S_{R^*}$ and $S_{B^*}$ respectively provided by the CCD image sensors 31R and 31B as shown by the signal spectrum in the D-1 mode for reading by the first reading clock pulse $CK_{CCD1}$ in FIG. 13 and the signal spectrum in the D-2 mode for reading clock pulse $CK_{CCD2}$ in FIG. 14.

The color image signals $S_{R^*}$, $S_{G^*}$ and $S_{B^*}$ read out from the CCD image sensors 31R, 31G and 31B from the first and second reading clock pulses $CK_{CCD1}$ and $CK_{CCD2}$ are supplied to A/D converters 33R, 33G and 33B through analog processing circuits 32R, 32G and 32B which perform correlation double sampling processing, level control, etc.

The A/D converters 33R, 33G and 33B are selectively supplied with a clock rate equal to the sampling rate of the color image signals $S_{R^*}$, $S_{G^*}$ and $S_{B^*}$, that is, clock pulses $CK_{AD1}$ and $CK_{AD2}$ of sampling frequencies $f_{CCD1}$ and $f_{CCD2}$ the same as the above reading clock pulses $CK_{CCD1}$ and $CK_{CCD2}$, through a clock switch 43. The A/D converters 33R, 33G and 33B digitize the color image signals $S_{R^*}$, $S_{G^*}$ and $S_{B^*}$ by the above reading clock rates by the clock pulses $CK_{AD1}$ and $CK_{AD2}$ and form the digital color signals $D_{R^*}$, $D_{G^*}$ and $D_{B^*}$ of signal spectra the same as the spectra of the color image signals $S_{R^*}$, $D_{G^*}$ and $S_{B^*}$.

The digital color signals $D_R$, $D_G$ and $D_B$ obtained from the above A/D converters 33R, 33G and 33B are supplied to a first digital processing circuit 34.

The first digital processing circuit 34 is supplied with clock pulses $CK_{DP1}$ and $CK_{DP2}$ of sampling frequencies $f_{CCD1}$ and $f_{CCD2}$ the same as the above reading clock pulses $CK_{CCD1}$ and $CK_{CCD2}$ through the clock switch 43. The first digital processing circuit 34 performs image processing for each pixel such as defect correction without beat interference at the above reading clock rate by the clock pulses $CK_{DP1}$ and $CK_{DP2}$ on the digital color signals $D_{R^*}$, $D_{G^*}$ and $D_{B^*}$ of the above reading clock rate. The digital color signals $D_{R^*}$, $D_{G^*}$ and $D_{B^*}$ image processed for each pixel by the first digital processing circuit 34 are supplied to a second digital processing circuit 36 through rate converters 35R, 35G and 35B.

The rate converters 35R, 35G and 35B are supplied with the clock pulses $CK_{DP1}$ and $CK_{DP2}$ of the sampling frequencies $f_{CCD1}$ and $f_{CCD2}$ the same as the above reading clock pulses $CK_{CCD1}$ and $CK_{CCD2}$ through the clock switch 43 and are supplied with the first transmission clock pulse CK$_{STD1}$ from a first transmission clock generator 46 or a second transmission clock pulse CK$_{STD2}$ from a second transmission clock generator 47 through a clock switch 48.

The first transmission clock generator 46 outputs a first processing clock pulse CK$_{DP21}$ of a sampling frequency 2f$_{STD1}$ (27 MHz) of twice the sampling frequency f$_{STD}$(858f$_H$- 13.5 MHz) of the D-1 standard. The second transmission clock generator 47 outputs a second processing clock pulse CK$_{DP22}$ of a sampling frequency 2f$_{STD2}$ (28.6 MHz) of twice the sampling frequency f$_{STD2}$ (4fSC=14.3 MHz) of the D-2 standard. The clock switch 48 is controlled in switching by the system controller 42 so as to select the first processing clock pulse CK$_{DP22}$ in the D-1 mode and to select the second processing clock pulse CK$_{DP21}$ in the D-2 mode.

For the above rate converters 35R, 35G and 35B, use is made of ones the same in structure as the rate converters 5R, 5G and 5B in the first embodiment.

The rate converter 35G performs rate conversion processing for converting the digital color signal D$_G$* of the reading clock rate of the sampling frequency f$_{CCD1}$(18.00) MHz) to a digital color signal D$_G$ of the processing clock rate of the sampling frequency 2f$_{STD1}$ (27 MHz) of twice the sampling frequency of the D-1 standard in the D-1 mode.

The rate converters 35R and 35B perform rate conversion processing for converting the digital color signals D$_R$* and D$_B$* of the reading clock rate to digital color signals DR and D$_B$ of the processing clock rate of a sampling frequency 2f$_{STD1}$(27 MHz) of twice the sampling frequency f$_{STD1}$ of the D-1 standard in the D-1 mode.

Figure 15:
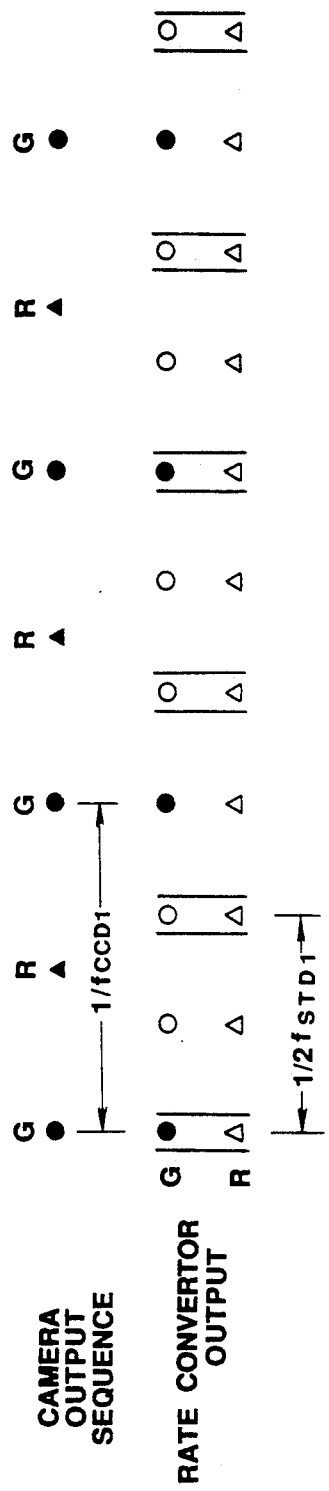
FIG. 15 is a schematic view used for explaining operation of a rate converter in operation in the D-1 mode of the apparatus of FIG. 12.

That is, the rate converters 35R. 35G and 35B perform rate conversion processing on the digital color signals D$_R$*, D$_G$* and D$_B$* of the reading clock rate of the sampling frequency F$_{STD1}$ (18.00 MHz) supplied from the first digital processing digital processing circuit 34 by interpolation processing and down sampling processing as shown in FIG. 11 and FIG. 15 in the D-1 mode, wherein if m$_1$=4 and n$_1$=3:

$$\begin{aligned} f_{STD1} &= f_{CCD1} \cdot 2n_1/m_1 \\ &= 18.00 \cdot 2 \cdot 3/4 \text{ MHz} \\ &= 27 \text{ MHz} \end{aligned}$$

and form the digital color signals D$_R$, D$_G$ and D$_B$** of the transmission clock rate of the sampling frequency 2f$_{STD}$ (27 MHz) of twice the sampling frequency f$_{STD1}$ of the D-1 standard.

Figure 14:
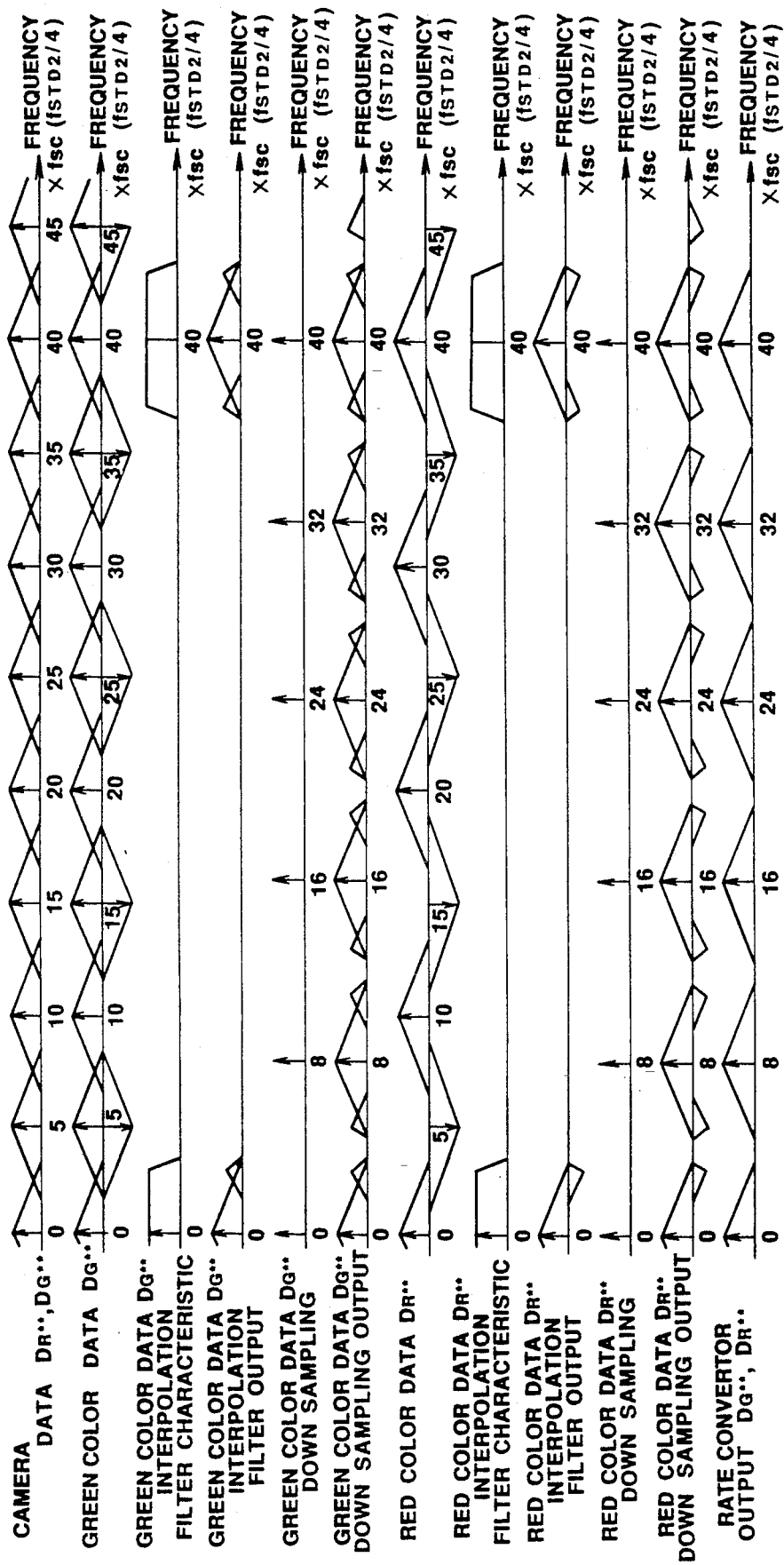
FIG. 14 is a schematic view of a signal spectrum used for explaining operation in the D-2 mode of the apparatus of FIG. 12.
Figure 16:
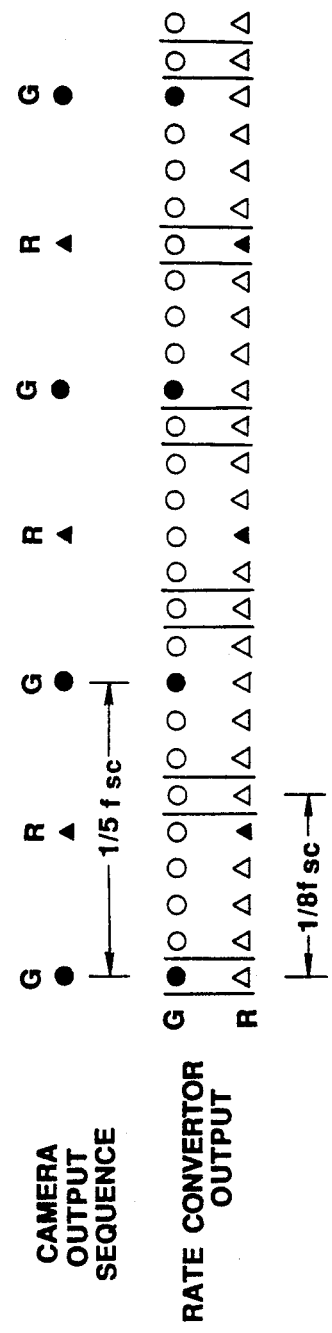
FIG. 16 is a schematic view used for explaining operation of the rate converter the D-2 mode of the apparatus of FIG. 12.

The rate converters 35R, 35G and 35B perform rate conversion processing as shown in FIG. 14 and FIG. 16 on the digital color signals D$_R$*, D$_G$* and D$_B$* of the reading clock rate of the sampling frequency f$_{CCD2}$ (17.898 MHz) supplied from the first digital processing circuit 34 in the D-2 mode, wherein if n$_2$=4 and m$_2$=5:

$$\begin{aligned} f_{STD2} &= f_{CCD} \cdot 2 \cdot n_2/m_2 \\ &= 17.898 \cdot 2 \cdot 4/5 \text{ MHz} \\ &= 28.6 \text{ MHz} \end{aligned}$$

and form the digital color signals D$_R$, D$_G$ and D$_B$** of the processing clock rate of the sampling frequency 2f$_{STD2}$ (28.6 MHz) of twice the sampling frequency f$_{STD2}$ of the D-2 standard.

The digital color signals D$_R$, D$_G$ and D$_B$** of the processing clock rate of the sampling frequencies 2f$_{STD1}$ and 2f$_{STD2}$ obtained from the rate converters 35R, 35G and 35B are down sampled to a ½ clock rate by a down sampling circuit 38RGB and are serially output as the digital color signals D$_R$, D$_G$ and D$_B$ of the transmission clock rate of the sampling frequency F$_{STD1}$ of the D-1 standard or the sampling frequency f$_{STD2}$ of the D-2 standard through a parallel/serial conversion circuit 39RGB. Further, the digital color signals DR, DG and DB of the processing clock rate of the sampling frequencies 2f$_{STD1}$ and 2f$_{STD2}$ obtained from the rate converters 35R, 35G and 35B are subjected to processing such as gamma correction at the processing clock rate in a second digital processing circuit 36, then are supplied to a third digital processing circuit 37 and are made analog in format by D/A converters 40R, 40G and 40B and are output as the analog color signals R, G and B through post-filters 41R, 41G and 41B.

In the third digital processing circuit 37, matrix computation processing is performed on the digital color signals D$_R$, D$_G$ and D$_B$ of the processing clock rate supplied from the second digital processing circuit 36 so as to form the digital luminance signal D$_Y$, the digital color difference signals D$_U$ and D$_V$, the composite video signals D$_{CS}$, and the viewfinder video signal D$_{VF}$.

The digital luminance signal D$_Y$ and the digital color difference signals D$_U$ and D$_V$** of the processing clock rate obtained from the above third digital processing circuit 37 are down sampled to a ½ clock rate by the down sampling circuit 38 and are output serially through a parallel/serial conversion circuit 39 as the digital color signals DR, DG and DB of the transmission clock rate of the sampling frequency f$_{STD1}$ of the D-1 standard or the sampling frequency f$_{STD2}$ of the D-2 standard.

The digital luminance signal D$_Y$, the digital color difference signals D$_U$ and D$_V$, the composite video signal D$_{CS}$, and the viewfinder video signal D$_{VF}$** obtained from the third digital processing circuit 37 are converted to an analog format by D/A converters 40Y, 40U, 40V, 40CS and 40VF and are output as the analog luminance signal Y, the analog color difference signals U and V, the analog composite video signal CS, and the viewfinder video signal VF, through post-filters 41Y, 41U, 41V, 41CS and 41VF, respectively.

In embodiments of solid state color camera apparatus according to the present invention, the color image signals read out from the solid state image sensors at a reading clock rate of a first frequency f$_{CCD}$ are digitized at the reading clock rate by an analog/digital conversion means, the image data of the reading clock rate digitized by the analog/digital conversion means are subjected to rate conversion processing to make F$_{STD}$=f$_{CCD}$.n/m (wherein m and n are positive integers and m>n) by a rate conversion means to form image data of a transmission clock rate of a second frequency f$_{STD}$, image data of the transmission clock rate obtained from the rate conversion means are subjected to image processing at the transmission processing rate by a data processing means, and the image data of the transmission clock rate of the second frequency f$_{STD}$ are output from the data processing means, so it is possible to form and output image data of a sampling rate of the D-1 standard or the D-2 standard from image signals read out from the solid state image sensors of a sampling rate (number of pixels) higher than the sampling rate in the D-1 standard or the D-2 standard. The sampling rate of the image signal read out from the solid state image sensor is higher than the sampling rate in the D-1 standard or the D-2 standard, so it is possible to avoid the effect of a partially-effective optical low-pass filter serving as the pre-filter for the solid state image sensor and directly to output a digital image signal with a high resolution, a reduced loopback strain, and excellent image quality. Moreover, since the sampling rate of the solid state image sensors and the sampling rate in the A/D conversion means for digitizing the image signals obtained by the solid state image sensors match, it is possible to prevent the occurrence of beat interference and it is possible to perform defect correction processing etc. for each pixel of the solid state image sensors by digital processing.

Therefore, with embodiments of the present invention, it is possible to obtain a digital image signal with a reduced loopback strain and an excellent image quality in a color television camera apparatus which directly outputs digital image signals complying with the D-1 standard or the D-2 standard.

Also, in other embodiments, the color image signals read out from the solid state image sensors at a reading clock rate of a first frequency $f_{CCD}$ are digitized at the reading clock rate by an A/D conversion means, the photographic data of the reading clock rate digitized by the A/D conversion means are subjected to rate conversion processing to make $2f_{STD}=f_{CCD}\cdot n/m$ (wherein m and n are positive integers and m>n) by a first rate conversion means to form image data of a processing clock rate of a second frequency $2f_{STD}$, image data of the processing clock rate obtained from the first rate conversion means are subjected to image processing at the processing clock rate by a data processing means, and the image data of the processing clock rate obtained from the data processing means are converted to image data of the transmission clock rate of the third frequency $f_{STD}$ by a second rate conversion means and output, so it is possible to form and output color image data of a sampling rate of the D-1 standard or the D-2 standard from image signals read out from the solid state image sensors of a sampling rate higher than the sampling rate in the D-1 standard or the D-2 standard. The sampling rate of the image signal read our from the solid state image sensor is higher than the sampling rate in the D-1 standard or the D-2 standard, so it is possible to avoid the effect of a partially-effective optical low-pass filter serving as the pre-filter for the solid state image sensor and directly to output a digital image signal with a high resolution, a reduced loop-back strain, and an excellent image quality. Further, since the sampling rate of the solid state image sensors and the sampling rate in the A/D conversion means for digitizing the image signals obtained by the solid state image sensors match, it is possible to prevent the occurrence of beat interference and it is possible to perform defect correction processing etc. for each pixel of the solid state image sensors by digital processing.

Moreover, since the image data of the above processing clock rate obtained from the data processing means are converted into an analog form by the D/A conversion means and then output, it is possible to output an analog color image signal of a high resolution.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A solid state camera apparatus comprising:
    solid state image-sensing means for generating image signals representing an image at a reading clock frequency $f_{CCD}$;
    analog/digital conversion means for converting said image signals generated by said solid state image-sensing means into a corresponding digital video signal having said reading clock frequency $f_{CCD}$;
    rate conversion means for receiving said digital video signal from said analog/digital conversion means and for converting the reading clock frequency of said digital video signal into a second clock frequency $f_{STD}=f_{CCD} * n/m$ (where m and n are positive integers and m>n) to form a corresponding rate-converted digital video signal having said second clock frequency $f_{STD}$; and
    processing means for receiving said rate-converted digital video signal and for performing image processing thereon at said second clock frequency to form a processed video signal; and
    means for outputting said processed video signal.

2. Apparatus according to claim 1, further comprising:
    parallel/serial conversion means for converting said processed video signal from parallel to serial format to form a serial video signal; and
    means for outputting said serial video signal.

3. A solid state camera apparatus comprising:
    clock signal generating means for outputting a reading clock signal having a selected one of a first frequency $f_{CCD1}$ and a second frequency $f_{CCD2}$;
    solid state image-sensing means for receiving said reading clock signal and reading out a video signal representative of an image in response to said reading clock signal;
    analog/digital conversion means for receiving said reading clock signal and for converting said video signal read out from said solid state image-sensing means to a corresponding digital video signal having a clock frequency equal to said selected one of said first and second frequencies;
    rate conversion means for receiving said digital video signal from said analog/digital conversion means and for converting said digital video signal to a corresponding rate-converted digital video signal by converting said clock frequency to a clock rate that is equal to a third frequency $f_{STD1}=f_{CCD1} *n/m$ if said first frequency $f_{CCD1}$ is said selected one of said first and second frequencies and is equal to a fourth frequency $f_{STD\ 2}=f_{CCD2} * n/m$ if said second frequency $f_{CCD2}$ is said selected one of said first and second frequencies, where m and n are positive integers and m>n, said third frequency $f_{STD1}$ being equal to a sampling frequency of a first video signal format and said fourth frequency $f_{STD2}$ being equal to a sampling frequency of a second video signal format; and
    processing means for receiving said rate-converted digital video signal and for performing image processing thereon to form a processed video signal that is in one of said first and second video signal formats; and means for outputting said processed video signal.

4. Apparatus according to claim 3, wherein said clock signal generating means comprises:

first clock means for generating a clock signal having said first frequency $f_{CCD1}$;

second clock means for generating a clock signal having said second frequency $f_{CCD2}$; and switching means for connecting said solid state image-sensing means and said analog/digital conversion means to a selected one of said first and second clock means.

5. Apparatus according to claim 3, further comprising parallel/serial conversion means for converting said processed video signal from parallel to serial format.

6. A solid state camera apparatus comprising:

solid state image sensing means for generating video signals representing an image at a reading clock frequency $f_{CCD}$;

analog/digital conversion means for converting said video signals generated by sad solid state image-sensing means into a corresponding digital video signal having said reading clock frequency;

first rate conversion means for receiving said digital video signal from said analog/digital conversion means and for converting the clock frequency of said digital video signal into a second clock frequency $2f_{STD}$, where $f_{STD}=f_{CCD} * n/m$ and m and n are positive integers and m>n, to form a corresponding rate-converted digital video signal;

processing means for receiving said rate-converted digital video signal and for performing image processing thereon at said second clock frequency $2f_{STD}$ to form a processed digital video signal having said second clock frequency $2f_{STD}$;

second rate conversion means for receiving said processed digital video signal and for converting said second clock frequency $2f_{STD}$ into a third clock frequency $f_{STD}$ to form a down-converted digital video signal having said third clock frequency $f_{STD}$, said third clock frequency $f_{STD}$ being one-half of said second clock frequency $2f_{STD}$;

digital/analog conversion means for receiving said processed digital video signal from said processing means and for converting said processed digital video signal to an analog signal;

means for outputting said analog signal; and means for outputting said down-converted digital video signal.

7. Apparatus according to claim 6, further comprising parallel/serial conversion means for converting said down-converted digital video signal from parallel to serial format.

8. A solid state camera apparatus comprising:

green, red and blue solid state image-sensing means for respectively picking up green, red, and blue color images and for generating respective corresponding color signals at a reading clock frequency $f_{CCD}$, the respective means all having a spatial sampling pitch τs and being disposed so that said red and blue image-sensing means are shifted spatially by exactly ½ of said sampling pitch τs with respect to said green image-sensing means;

analog/digital conversion means for receiving the color signals from the respective solid state image-sensing means and for converting said color signals into corresponding digital color signals having said reading clock frequency $f_{CCD}$;

rate conversation means for receiving said digital color signals from said analog/digital conversion means and for converting the respective clock frequencies of said digital color signals into a second clock frequency $f_{STD}=f_{CCD} * n/m$ (where m and n are positive integers and m>n) and forming to form respective corresponding rate-converted digital color signals having said second clock frequency $f_{STD}$;

processing means for receiving said rate-converted digital color signals and for performing image processing thereon at said second clock frequency to form respective processed digital color signals; and means for outputting said processed digital color signals as an output video signal.

9. A solid state camera apparatus comprising:

green, red and blue solid state image-sensing means for respectively picking up green, red and blue color images and for generating respective corresponding color signals at a reading clock frequency $f_{CCD}$, the respective means all having a spatial sampling pitch τs and being disposed so that said red and blue image-sensing means are shifted spatially by exactly ½ of said sampling pitch τs with respect to said green image-sensing means;

analog/digital conversion means for receiving the color signals from the respective solid state image-sensing means and for converting said color signals into corresponding digital color signals having said reading clock frequency $f_{CCD}$;

rate conversation means for receiving said digital color signals from said analog/digital conversion means and for converting the respective clock frequencies of said digital color signals into a second clock frequency $2f_{STD}$, where $f_{STD}=f_{CCD} * n/m$ and m and n are positive integers and m>n, to form corresponding respective rate-converted digital color signals having said second clock frequency $2f_{STD}$;

processing means for receiving said rate-converted digital color signals and for performing image processing thereon at said second clock frequency to form corresponding respective processed digital color signals having said second clock frequency;

second rate conversion means for receiving said processed digital color signals and for converting said second clock frequency into a third clock frequency $f_{STD}$ to form respective down-converted digital video signals having said third clock frequency $f_{STD}$, said third clock frequency $f_{STD}$ being one-half of said second clock frequency $2f_{STD}$;

digital/analog conversion means for converting said processed digital color signals to respective analog color signals;

means for outputting said analog color signals; and means for outputting said down-converted digital video signals.

10. A solid state camera apparatus comprising:

clock signal generating means for outputting a reading clock signal having a selected one of a first frequency $f_{CCD1}$ and a second frequency $f_{CCD2}$; and solid state image-sensing means for receiving said reading clock signal, reading out video signals representative of an image at a clock rate equal to said selected one of said first and second frequencies, digitizing said read out video signals at a clock rate equal to said selected one of said first and second frequencies to form corresponding digital video signals, and converting said digital video signals into corresponding rate-converted digital video signals which are in a first video signal format and have a clock frequency equal to a third frequency $f_{STD1}$ if said first frequency $f_{CCD1}$ is said selected one of said first and second frequencies, and which are in a second video signal format and have a clock frequency equal to a fourth frequency $f_{STD2}$ if said second frequency $f_{CCD2}$ is said selected one of said first and second frequencies;

said solid state image-sensing means providing a number of pixels that is based on said selected one of said first and second frequencies.

11. Apparats according to claim 8, wherein n is an odd number and said rate conversion means comprises interpolation filter means for up-converting said digital color signals, said signals comprising a green signal, a red signal and a blue signal, said interpolation filter means having respective filter characteristics that are substantially the same for said green, red and blue signals in a pass band consisting of the frequencies 0 to $f_{STD}/2$ and having respective filter characteristics with respect to said red and blue signals at a frequency $nf_{CCD}$ that are different from its filter characteristic with respect to said green signal at said frequency $nf_{CCD}$.

12. Apparatus according to claim 9, wherein n is an odd number and said rate conversion means comprises interpolation filter means for up-converting said digital color signals, said signals comprising a green signal, a red signal and a blue signal, said interpolation filter means having respective filter characteristics that are substantially the same for said green, red and blue signals in a pass band consisting of the frequencies 0 to $f_{STD}/2$ and having respective filter characteristics with respect to said red and blue signals at a frequency $nf_{CCD}$ that are different from its filter characteristic with respect to said green signal at said frequency $nf_{CCD}$.

* * * * *